(12) United States Patent
Storms

(10) Patent No.: US 7,261,353 B2
(45) Date of Patent: Aug. 28, 2007

(54) DIVIDERS FOR REDUCTION OF AERODYNAMIC DRAG OF VEHICLES WITH OPEN CAVITIES

(75) Inventor: Bruce L. Storms, Arnold, CA (US)

(73) Assignee: AerospaceComputing, Inc., Mountain View, CA (US)

(*) Notice: Subject to any disclaimer, the term of this patent is extended or adjusted under 35 U.S.C. 154(b) by 106 days.

(21) Appl. No.: 11/097,052

(22) Filed: Apr. 1, 2005

(65) Prior Publication Data

US 2006/0181111 A1    Aug. 17, 2006

Related U.S. Application Data

(60) Provisional application No. 60/653,603, filed on Feb. 15, 2005.

(51) Int. Cl.
*B62D 35/00* (2006.01)
*B61D 45/00* (2006.01)

(52) U.S. Cl. .................. 296/24.4; 296/180.4; 105/355; 410/129; 114/72

(58) Field of Classification Search ................. 105/358, 105/359, 360, 355; 220/500, 553, 554, 263, 220/264, 1.5, 1.6, 2; 296/183.1, 24.4, 183.2, 296/180.1, 180.4; 410/129, 141, 142; 114/72
See application file for complete search history.

(56) References Cited

U.S. PATENT DOCUMENTS

| | | | | |
|---|---|---|---|---|
| 2,090,961 A | * | 8/1937 | Nelson et al. | 280/831 |
| 3,820,475 A | * | 6/1974 | Beeson | 410/32 |
| 3,850,332 A | * | 11/1974 | Marko | 220/551 |
| 4,011,826 A | * | 3/1977 | Yee | 114/65 A |
| 4,368,673 A | * | 1/1983 | Dvorscak | 105/248 |
| 4,569,289 A | * | 2/1986 | Gielow et al. | 105/1.1 |
| 4,898,101 A | * | 2/1990 | Harter | 105/247 |
| 4,909,154 A | * | 3/1990 | Walker et al. | 105/1.1 |
| 5,029,532 A | * | 7/1991 | Snead | 105/239 |
| 5,226,371 A | * | 7/1993 | Dingle | 105/358 |
| 5,488,912 A | * | 2/1996 | Pileggi et al. | 105/422 |
| 6,267,427 B1 | * | 7/2001 | Ziehl | 296/37.6 |

* cited by examiner

*Primary Examiner*—D. Glenn Dayoan
*Assistant Examiner*—Melissa Black
(74) *Attorney, Agent, or Firm*—Fenwick & West LLP (57) ABSTRACT

A drag-reduction concept for vehicles with open cavities includes dividing a cavity into smaller adjacent cavities through installation of one or more vertical dividers. The dividers may extend the full depth of the cavity or only partial depth. In either application, the top of the dividers are typically flush with the top of the bed or cargo bay of the vehicle. The dividers may be of any material, but are strong enough for both wind loads and forces encountered during cargo loading/unloading. For partial depth dividers, a structural angle may be desired to increase strength.

8 Claims, 7 Drawing Sheets

DIVIDERS FOR REDUCTION OF AERODYNAMIC DRAG OF VEHICLES WITH OPEN CAVITIES

CROSS REFERENCE TO RELATED APPLICATIONS

This application claims priority under 35 USC § 119(e) to U.S. Provisional Patent Application No. 60/653,603 titled "Dividers for Reduction of Aerodynamic Drag of Vehicles with Open Cavities", Filed Feb. 15, 2005, the contents of which are herein incorporated by reference.

STATEMENT OF GOVERNMENT RIGHTS

This invention was made with Government support under contract number NAS2-03144 awarded by NASA. The Government has certain rights in the invention.

BACKGROUND OF THE INVENTION

1. Field of the Invention

The present invention generally relates to the field of transportation vehicles, and more specifically, to devices to reduce aerodynamic drag of vehicles having open cavities.

2. Description of the Related Art

Open beds, cargo bays, and cavities are highly inefficient from an aerodynamic perspective. For example, in rail transport systems covering an empty open container car has been shown to reduce drag by as much as 40%. However, covering the bed or cargo bay is seldom practical due the size, the required hardware, and the effort involved. As a result, these vehicles typically operate uncovered on long journeys (up to 1000 miles for coal cars).

To provide a more detailed example of how inefficient open cargo and bays on transport vehicles, consider an example of transportation in the coal industry. Coal accounts for almost 50% of the total electricity production in the United States alone. Of the total coal consumption, almost two-thirds is carried by rail. By far the most important rail commodity, as of 2002 coal accounted for almost 44% of tonnage, 25% of carloads, and 21% of revenue. In 2002, almost 7.9 million carloads of coal were hauled via rail. Moreover, over 85% of all railroad coal shipments are carried by unit trains of 50 or more carloads. Typically, these shipments transport the coal without interruption from the loading facilities to the power plants.

Due to the increasing use of low sulfur western coal in power plants throughout the country, the average coal haul has risen significantly in recent years from 558 miles in 1992 to 696 miles in 2001. Over the same period, however, the revenue per ton-mile decreased by 23% due to the competitive environment for coal transportation created by alternate energy sources, transportation modes, and railroads.

The potential for energy savings by reducing the aerodynamic drag of coal cars is significant. A previous study of aerodynamic drag of coal cars suggests that a 25% reduction in drag of the empty cars would correspond to a 5% fuel savings for a round trip. Since coal transport consumes approximately 1.5 billion gallons of diesel fuel annually, a 5% fuel savings would total 75 million gallons per year. This corresponds to 2% of all Class I railroad fuel consumption.

Moreover, fuel consumption issues affecting open coal railcars also affects other open container transport vehicles, for example, railroad grain cars, container ships, truck trailers, and even pickups. Reducing aerodynamic drag in each of these transport vehicles would save wear and tear, save energy, and reduce overall fuel consumption.

Devices to reduce aerodynamic drag do exist, but are either too cumbersome, too costly, or a combination of both. Most prior art deals with cavity coverings. For example, open rail cars can be fitted with a soft or hard covering. However, such coverings must be manually installed resulting in increased manpower and time, which reduces productivity.

Automated soft covers eliminate or reduce the need for manpower and provide some time savings. However, automated soft covers require machinery to roll the covers over or retract the covers from the cargo bay. This machinery adds extra weight to the vehicle so that fuel savings are significantly reduced or eliminated. Further, soft coverings also are prone to quicker wear and tear so that the frequency of repair and replacement also reduce or eliminate hoped for savings. Moreover, because most open cargo and open bay vehicles are designed for long life with a minimum of moving parts, flexible covers and moving doors end up being very poor options.

In addition, hard covers also have several drawbacks. Hard covers add weight to the vehicle. The added weight requires an increased need for power to move the transport vehicle so that any fuel savings from reduction of aerodynamic drag are significantly reduced or eliminated due to the increased weight. In most instances, the added weight of a cargo-bay cover will also reduce the amount of cargo that may be transported due to weight restrictions.

From the above, there is a need for a system and process to reduce aerodynamic drag in open cargo bays and beds of vehicles, which can help energy efficiency and help realize energy savings.

SUMMARY OF THE INVENTION

The present invention includes a system and a method for reducing aerodynamic drag in vehicles with open beds or cargo bays. Examples of such vehicles include train cars, truck trailers, pickup trucks, and any other container with an open cavity. In one embodiment, a drag-reduction concept divides a cavity into smaller adjacent cavities by installing one or more vertical dividers. These dividers may or may not extend the entire height of the cavity depending on the application. The dividers typically run the width of the vehicle. Further, some embodiments may include use of longitudinal dividers.

In one example embodiment, a coal car includes a long rectangular bay that is divided into four nominally square cavities by installing three dividers. The dividers may extend the full depth of the cavity or only partial depth. In either application, the top of the dividers are typically flush with the top of the bed or cargo bay. The dividers may be of any material, but are configured to be strong enough for both wind loads and forces encountered during cargo loading/unloading. For partial depth dividers, a structural angle may be desired to increase strength.

Once installed, the dividers are configured to remain rigid. For example, in existing vehicles, the dividers may include metal plates that are retrofitted into the vehicle by welding the plates to opposite walls of the vehicle. In other example embodiments, brackets may be installed into opposite walls of a vehicle to allow a plate to be slid into the brackets and secured through friction or some securing means such as screws, bolts, ties, adhesive, or semi-permanent weldings. Thus, the principles of the present invention are applicable for both permanent and semi-permanent configurations.

The present invention significantly reduces drag of a coal car at zero yaw angle. Further, the present invention may also significantly reduce drag for crosswind. The drag reduction is due to the fact that the flow over the smaller adjacent cavities is more uniform with reduced down flow and pressure on the back of the cargo bay. A regular recirculating flowfield fills each cavity created by the dividers.

In addition, the dividers are configured to advantageously allow cargo such as grain, coal, or dirt to be loaded or unloaded with little to no interference. Moroever, the principles and benefits of the present invention are also applicable to other open bed or cargo bay vehicles, for example, cargo trucks, pickup trucks, grain rail cars, container ships, or the like, hence, providing transport systems utilizing the present invention with energy savings and efficiency.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. ("FIG.") 1A and 1B illustrate examples of fixed dividers for use in an open air vehicle in accordance with the present invention.

DETAILED DESCRIPTION OF THE PREFERRED EMBODIMENTS

The Figures ("FIG.") and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The present invention includes incorporating a divider system in an open air vehicle to improve aerodynamic flow. An open air vehicle includes vehicles having an open bed or cargo bay. Examples of open air vehicles include rail coal cars (or other open top rail vehicles such as grain cars), open top truck containers, open top cargo ships, pick up trucks, and the like. For ease of discussion, the present invention will be discussed with reference to rail coal cars, although those skilled in the art will understand that the principles disclosed herein are applicable to other open air vehicles.

Figure 1A:
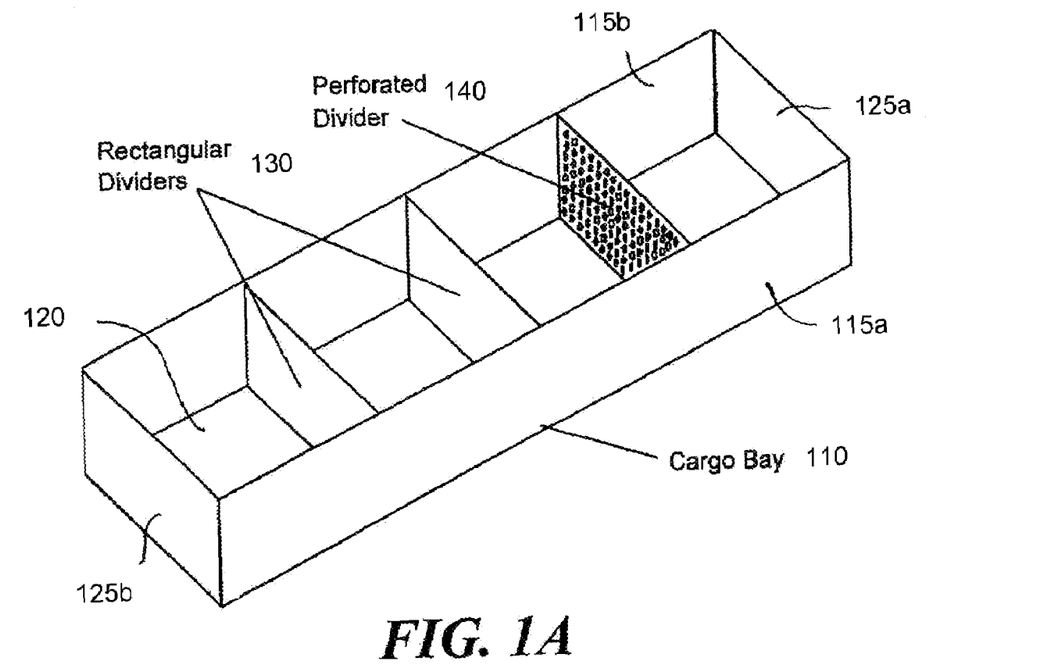
Figure 1B:
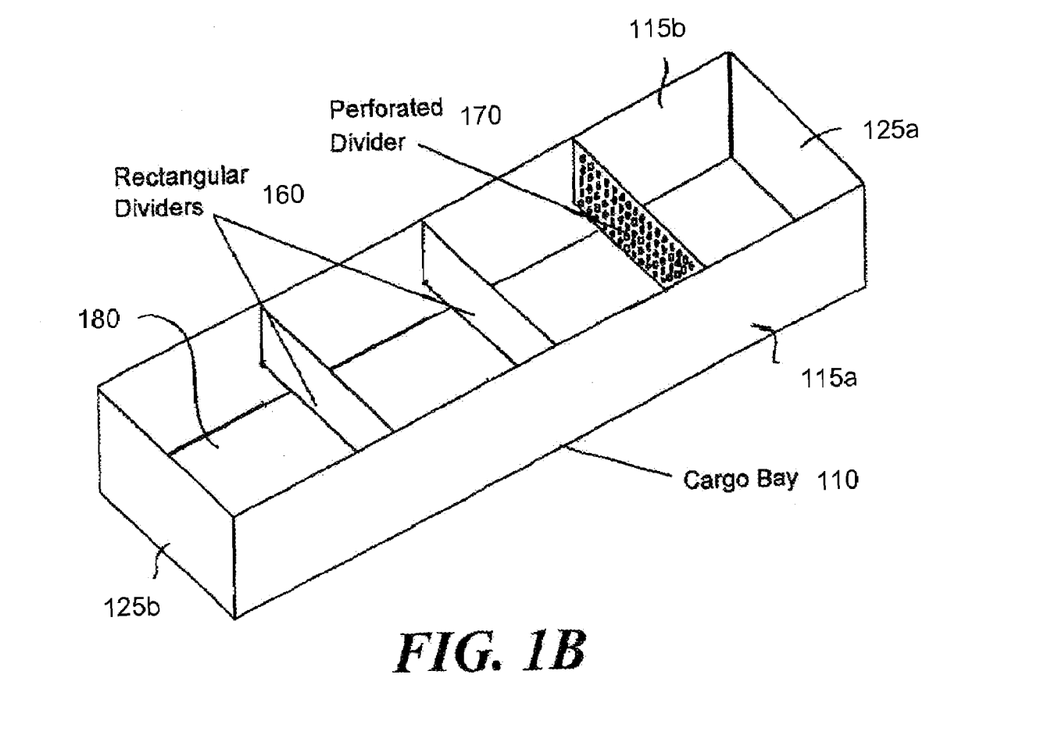

Referring now to FIGS. ("FIGS.") 1A and 1B, they illustrate examples of fixed dividers for use in an open air vehicle in accordance with the present invention. The example embodiments include a cargo bay 110 with a plurality of dividers 130, 140. The cargo bay 110 is structured to include four walls 115a, 115b and 125a, 125b and a base (or floor or bottom).

In the illustrated embodiments, the cargo bay is a cavity created by a rectangular shell of two long length (or elongated) walls 115a, 115b (generally 115) and two short length 125a, 125b (generally 125) walls with the base. Generally, the height of the four walls 115, 125 is typically the same (or substantially the same). In rail car, cargo truck trailer, cargo ship, or pickup truck vehicle configurations, the elongated walls (or sidewalls) 115 typically form sides of the vehicle, and the short length walls 125 form a front wall and a back wall of the vehicle. The back wall of the vehicle is typically the wall that is opposite the direction of motion (or direction of propulsion) of the vehicle. Note that vehicles such as pick-up trucks would have dividers that are approximately the height of a bed of the pickup, but could also extend above the top of the bed.

In the example of FIG. 1A, two dividers 130 are solid and one divider 140 is perforated. In other embodiments, all the dividers may be solid or all may be perforated. An example of a perforated divider is illustrated in FIG. 2C as a rigid member with perforations (e.g., openings, such as holes) 280 as shown in the magnified window view. It is noted that the dividers (both solid and perforated) are configured of a rigid material, for example, a metal (e.g., steel, iron, aluminum), rigid rubber, a plastic (e.g., rigid polycarbonate), wood, or a composite of such materials. Perforated dividers allow the flow of cargo like coal or grain between adjacent compartments resulting in a more even load.

In the illustrated embodiment, the dividers 130, 140 are configured so a top of the dividers 130, 140 is substantially flush (e.g., flush or almost flush with) the elongated walls 115a, 115b of the cargo bay 110 and a bottom of the dividers 130, 140 is substantially flush (e.g., flush or almost flush with) with the bottom of the walls 115a, 115b of the cargo bay 110. The bottom of the walls 115, 125 of the cargo bay 110 typically join (e.g., connected to or molded into) the base or floor of the cargo bay 110. The illustrated embodiments show the installed dividers 130, 140 located equidistant from each other to create four compartments 120 from the cargo bar 110. It is noted, however, in alternative embodiments that the divider need not be flush with the top (and/or bottom) of the elongated walls 115a, 115b, for example, in configurations such as pick up cargo beds.

In the example of FIG. 1B, there are again three dividers 160, 170 (in this example also there are two solid dividers 160 and one perforated divider 170) spaced equidistant apart. However, in this embodiment, while the top of the dividers 160, 170 are substantially flush with the top of the walls 115a, 115b of the cargo bay 110, the bottoms of the dividers 160, 170 do not reach the bottom of the walls 115a, 115b or base of the cargo bay 110. Rather, the dividers are configured to only run a partial length of opposite walls 115a, 115b of the cargo bay 110. Here, compartments 180 created by the dividers are "open" along bottom edges of the dividers 160, 170. Hence, as an example, if the cargo bay 110 was loaded with coal, coal from one compartment could push into another compartment by slipping under the divider, e.g., 170.

The embodiments illustrated in FIGS. 1A and 1B may be configured so that the dividers are fixedly attached to the elongated walls 115a, 115b, of the cargo bay 110. The dividers may be welded, bolted, attached with adhesive, molded with the elongated 115a, 115b walls of the cargo bay 110, or otherwise substantially permanently fixed in place.

Figure 2A:
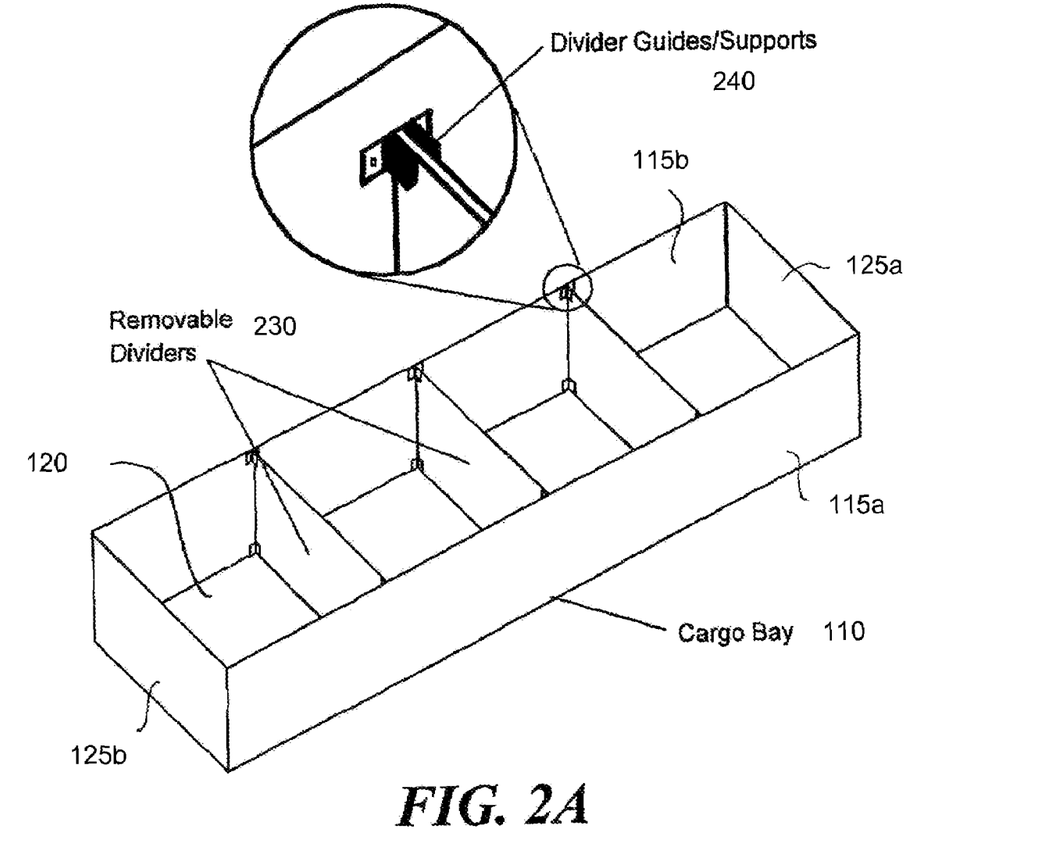
FIGS. 2A through 2C illustrate examples of removable dividers for use in an open air vehicle in accordance with the present invention.
Figure 2B:
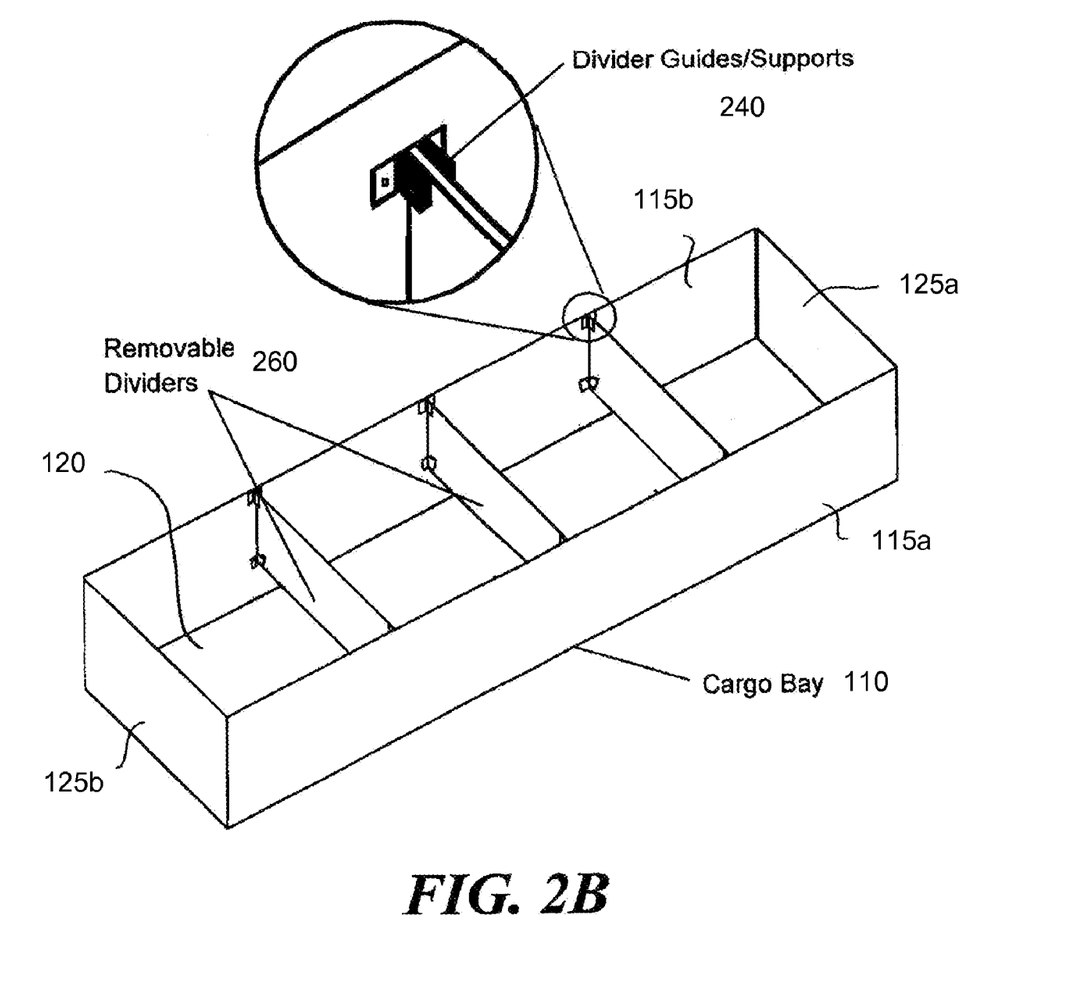
Figure 2C:
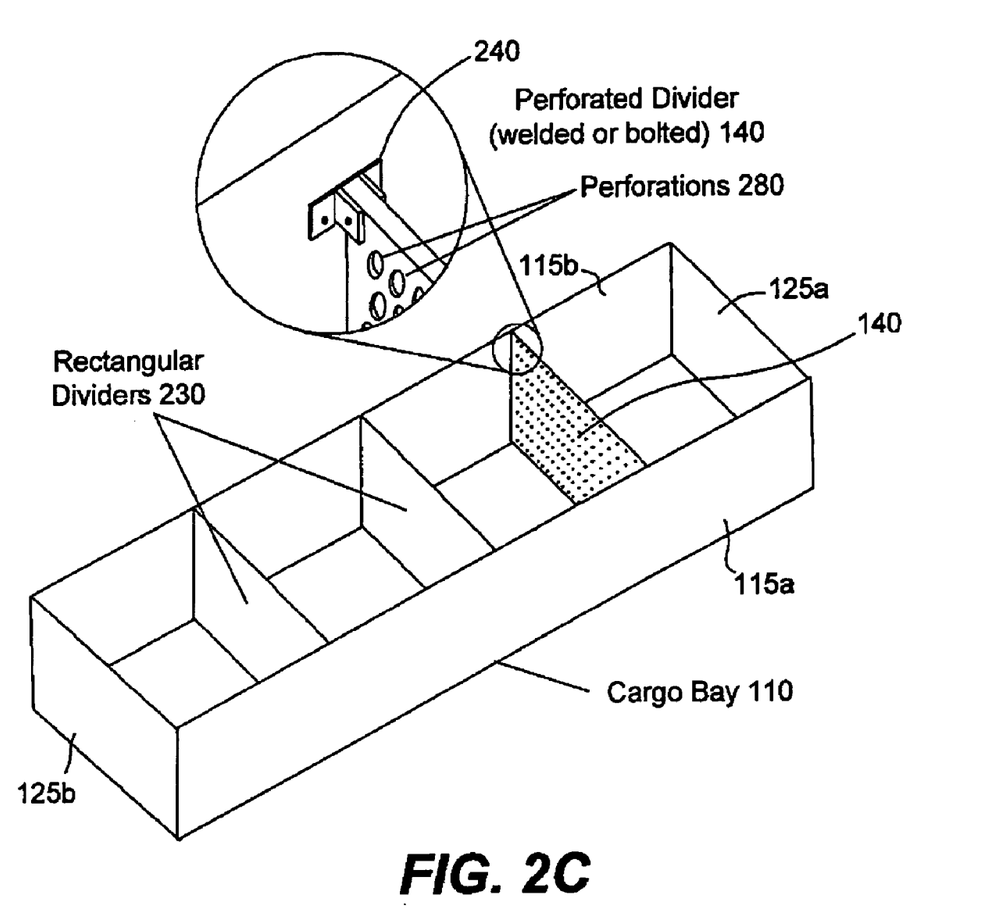

FIGS. 2A through 2C illustrate examples of removable dividers for use in an open air vehicle in accordance with the present invention. Again, for these example embodiments, a cargo bay 110 is illustrated with one or more dividers spaced equidistant apart. The embodiments in FIGS. 2A through 2C illustrate removably configured dividers for use in the cargo bay 110. In these embodiments, removable dividers 230, 260 are held in place in the cargo bay 110 through divider guides (or supports) 240 on the elongated walls 115a, 115b of the cargo bay 110.

Each divider guide 240 is secured to the elongated walls 115a, 115b of the cargo bay 110 in pairs, i.e., one on one wall 115a and one opposite on the facing wall 115b. One pair is configured to be along the top edge of the elongated walls 115a, 115b of the cargo bay 110 and the other pair is located along the bottom edge of the elongated wall 115a, 115b of the cargo bay 110 or along the elongated wall 115a, 115b where the bottom of the divider 230, 260 would reach, e.g., half way down the wall in the case of the short divider 260.

Each divider guide 240 includes an opening that is marginally greater than the thickness of the divider 230, 260 so that the divider 230, 260 can slide through the divider guide 240 as illustrated in the magnified views of FIGS. 2A through 2C. In addition, the bottom pair of divider guides 240 may also be configured to have a bottom itself so that the bottom of the divider 230, 260 rests along a bottom of the divider guide 240.

It is noted that the divider guides 240 can be made of any materials that provides substantial rigidity to ensure that the dividers remain in place when secured by them. The divider guides may be made of a metal, a substantially rigid rubber, a polycarbonate, wood, or a combination of materials. In addition, in alternate embodiments, the divider guides 240 can be configured to so that the dividers 230, 260 are secured in place using, for example, a nut and bolt configuration, a tie or strap system, an industrial clip configuration, or removable adhesive. Note that each configuration of FIGS. 2A through 2C provides a modular design that allows for use of the cargo bay 110 without the dividers 230, 260 if so desired.

Figure 3A:
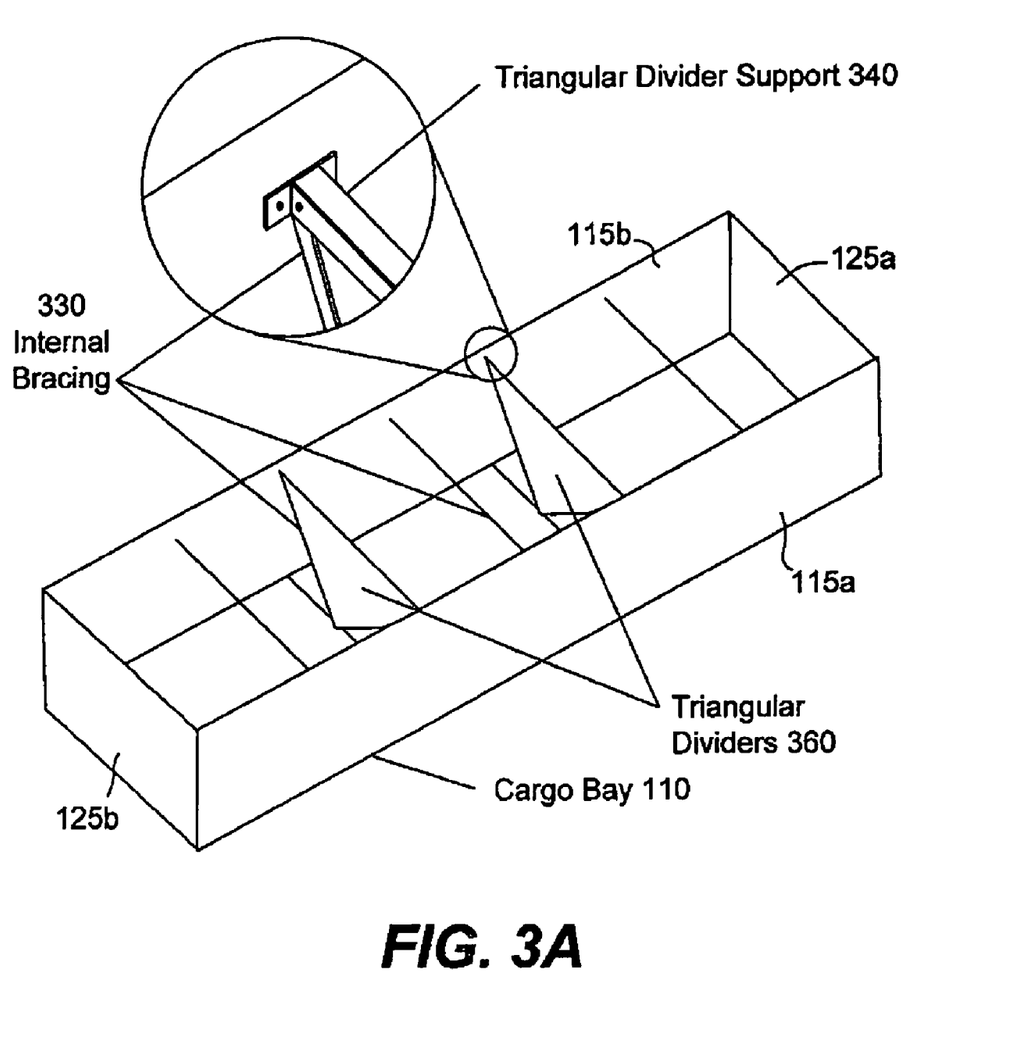
FIGS. 3A and 3B illustrate an example of triangular dividers for use in an open air vehicle in accordance with the present invention.
Figure 3B:
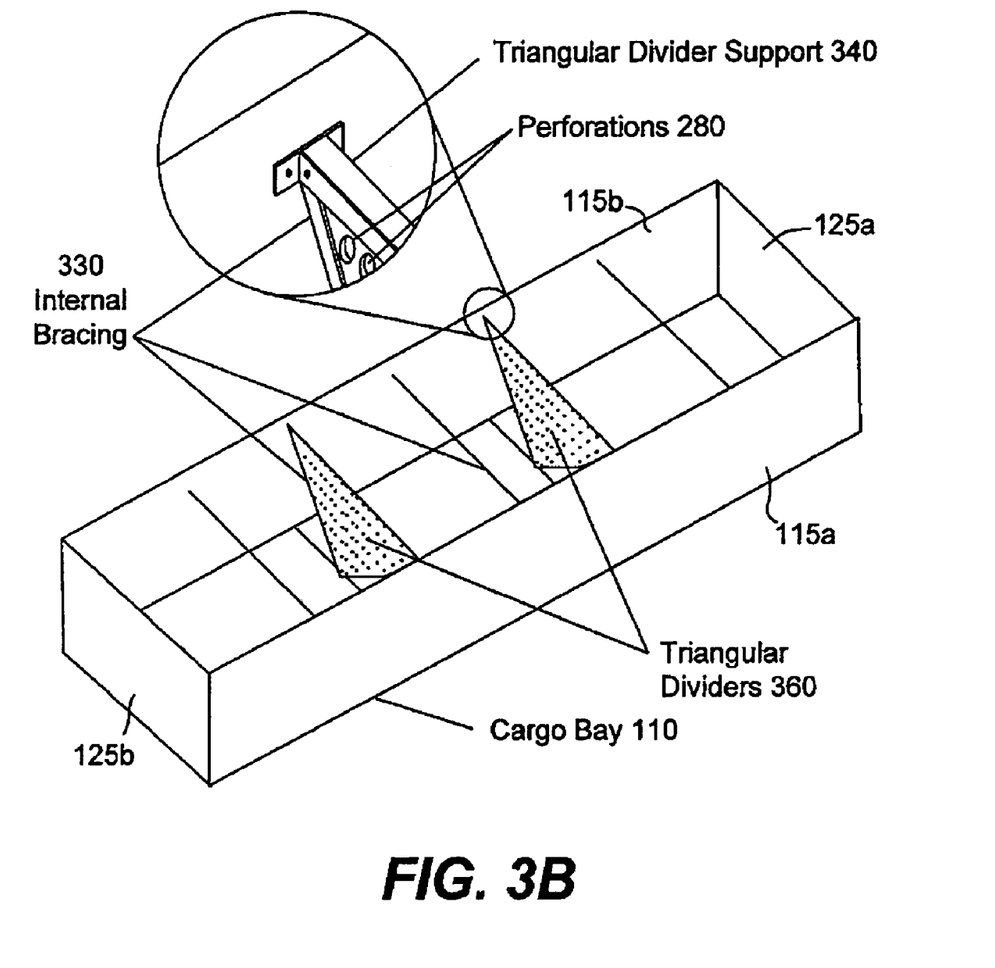

FIGS. 3A and 3B illustrate an example of triangular dividers for use in an open air vehicle in accordance with the present invention. In the example embodiments, the triangular dividers 360 can be frame structures, e.g., three brace structures assembled in a triangular pattern, to which a triangular plate is coupled (e.g., where the triangular bracing already may be in place within the cargo bay) or a substantially solid component in a triangular configuration. The triangular dividers 360 may be held into place by being welded or bolted onto opposing elongated walls 115a, 115b. Alternatively, the triangular dividers 360 may be held into place with a triangular divider support 340 that functions similar to the divider support 240 described previously.

Two points of the triangular divider 360 can be fixedly or removably attached as pairs along a substantially top edge of the elongated wall 115a, 115b of the cargo bay 110 as described in the previous embodiments. The third point of the triangular divide is fixedly or removably attached to the base of the cargo bay 110 or to a brace structure 330. Triangular dividers may be attached to the existing cargo bay bracing typical of modern coal car construction (i.e, bracing is not part of invention).

The brace structure 330 may traverse from one elongated wall 115a to the other elongated wall 115b between the base and top of each elongated wall 115a, 115b, e.g., the middle. As with the other embodiments previously described, the triangular dividers 360 may also be configured of a substantially rigid material. Additionally, the triangular dividers 360 may be spaced equidistant apart within the cargo bay 110.

Figure 4:
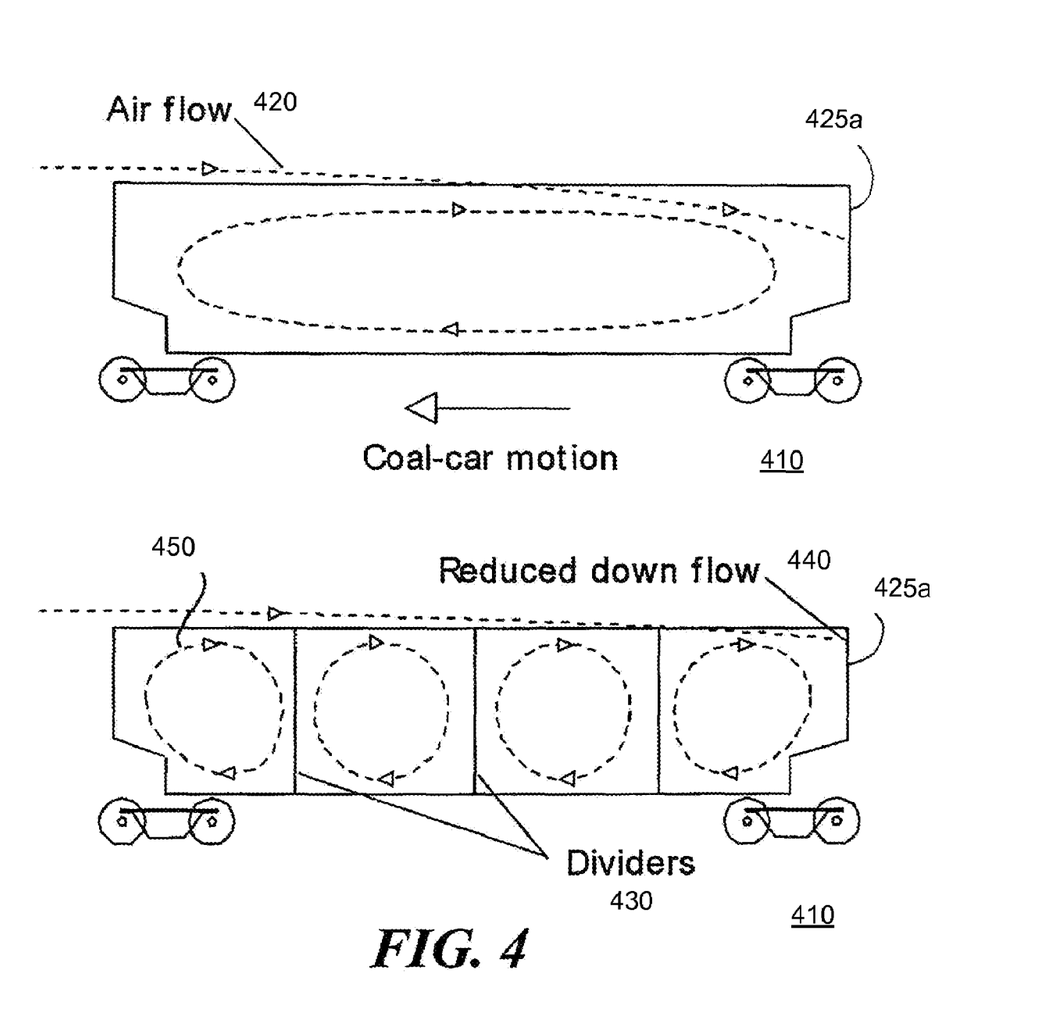
FIG. 4 illustrates an example of flow streamlines in a rail coal car without dividers and with dividers in accordance with the present invention.

FIG. 4 illustrates an example of flow streamlines in a rail coal car without dividers and with dividers in accordance with the present invention. In the illustration of the rail coal car without dividers (top), air flow is shown to create drag by exerting a high pressure region against a back wall 425a of the rail car (i.e., the short wall that is away from the direction of movement). In the illustration of the rail coal car with dividers (bottom), the air flow over the top of the coal car drops significantly less than without dividers, into the cargo bay. As a result, the high pressure region on the back wall 425a of the cargo bay is reduced along with overall drag.

It is noted that the cavity may be of shapes other than a rectangle, e.g., a square, hexagon, or the like, with the principles disclosed herein still applicable. Further, it is noted that the embodiments described herein may be mixed and matched, e.g., triangular dividers 360 with full dividers 130 or 230 and/or with short dividers 160, 260. In each instance, the top of the dividers is illustrated as being substantially flush with a top of the walls of the cargo bay 110. This configuration beneficially provides for more uniform air flow across the top of the cargo bay 110, and thus, reduces overall aerodynamic drag. However, it is noted that other configurations may also help reduce drag. For example, having a divider that is ¼ of the cargo bay depth below the top of the cargo bay or ¼ of the cargo bay depth higher than the top of the cargo bay still provides the benefit of reducing aerodynamic drag.

It is also noted that although the dividers have been illustrated and described as being spaced equidistant apart within the cargo bay, they need not always be spaced in such a configuration. Rather, alternative embodiments need only have the dividers spaced sufficiently apart so that air pressure against the back wall is reduced and overall aerodynamic drag is decreased.

The present invention significantly reduces drag of a coal car at zero yaw angle. Further, the present invention also significantly reduce drag for crosswind. The drag reduction is due to the fact that the air flow over the smaller adjacent cavities is more uniform with reduced down flow and pressure on the back of the cargo bay. As an example, the dividers direct air flow across the top of the cargo bay out the rear to reduce wind resitance caused by pressure on the back of the cargo bay. Moreover, a regular recirculating flowfield fills each cavity created by the dividers.

In addition, the dividers are configured to advantageously allow cargo such as grain, coal, or dirt to be loaded or unloaded with little to no interference. Moreover, the principles and benefits of the present invention are also applicable to other open bed or cargo bay vehicles, for example, cargo trucks, pickup trucks, grain rail cars, container ships, or the like, hence, providing transport systems utilizing the present invention with energy savings and efficiency.

In each embodiment, the cargo bay (or container) 110 is configured to appropriately couple a vehicle that is propelled. For example, a railcar hitch or a trailer hitch for coupling to, respectively, a locomotion engine (or other rail car) or a truck (or pickup). In another example, the cargo bay may be coupled by integrating with a vehicle configured for propulsion such as a cargo bed of a pickup truck or a container ship.

Upon reading this disclosure, those of skill in the art will appreciate still additional alternative structural and functional designs for a system and a process for reducing aerodynamic flow across vehicles with an open bed, cargo bay or other open cavity through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A cargo bay configured to reduce aerodynamic drag, the cargo bay comprising:
   a cavity formed by four walls and a floor, each wall having a top edge and a bottom edge; and
   a plurality of triangular plate dividers, each having a top edge and a bottom corner, the top edge of each divider configured to traverse between two opposite facing walls and the bottom corner of each divider configured to be attached to a floor of the cargo bay, each divider containing a plurality of perforations distributed at least across a surface of the divider adjacent to the bottom corner,
   wherein two opposite facing walls of the four walls are longer than other walls of the four walls and the top of each divider is fixedly attached to each longer wall of the cargo bay.

2. The cargo bay of claim 1, wherein the plurality of perforations is distributed across substantially all of the divider.

3. The cargo vehicle of claim 1, wherein the divider is substantially the same height as the two opposite facing sides of the cavity.

4. The cargo bay of claim 1, wherein the divider is substantially the same height as at least two opposite facing walls of the four walls.

5. The cargo bay of claim 1, wherein the cargo bay comprises a railcar.

6. The cargo bay of claim 1, wherein the cargo bay comprises a container ship.

7. The cargo bay of claim 1, wherein the cargo bay comprises a truck trailer.

8. The cargo bay of claim 1, wherein the cargo bay comprises a pickup truck.

* * * * *